(12) United States Patent
Schuster et al.

(10) Patent No.: US 6,625,119 B1
(45) Date of Patent: Sep. 23, 2003

(54) METHOD AND SYSTEM FOR FACILITATING INCREASED CALL TRAFFIC BY SWITCHING TO A LOW BANDWIDTH ENCODER IN A PUBLIC EMERGENCY MODE

(75) Inventors: Guido M. Schuster, Des Plaines, IL (US); Ikhlaq S. Sidhu, Vernon Hills, IL (US); Thomas J. Kostas, Evanston, IL (US); David A. Grabelsky, Skokie, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/270,968

(22) Filed: Mar. 17, 1999

(51) Int. Cl.[7] .............................................. H04L 12/26
(52) U.S. Cl. ...................................... 370/230; 370/468
(58) Field of Search ............................. 370/230, 230.1,
370/231, 235, 236, 352, 353, 354, 355,
356, 395.4, 395.41, 395.52, 401, 402, 403,
404, 465, 468

(56) References Cited

U.S. PATENT DOCUMENTS

| | | | | |
|---|---|---|---|---|
| 5,115,429 A | * | 5/1992 | Hluchyj et al. | 370/231 |
| 5,313,454 A | * | 5/1994 | Bustini et al. | 370/231 |
| 5,812,526 A | * | 9/1998 | Chang et al. | 370/230 |
| 5,933,490 A | | 8/1999 | White et al. | |
| 5,970,443 A | * | 10/1999 | Fujii | 704/219 |
| 6,122,338 A | * | 9/2000 | Yamauchi | 370/521 |
| 6,295,292 B1 | | 9/2001 | Voit et al. | |
| 6,307,839 B1 | | 10/2001 | Gerszberg et al. | |
| 6,333,931 B1 | | 12/2001 | LaPier et al. | |
| 6,389,005 B1 | | 5/2002 | Cruickshank | |

OTHER PUBLICATIONS

Paul Ferguson, "Simple Differential Services: IP TOS and Precedence, Delay Indication, and Drop Preference," Internet Draft, Mar. 12, 1998.

Ed Ellesson and Steven Blake, "A Proposal for the Format and Semantics of the TOS Lyte and Traffic Class Byte in IPv4 and IPv6 Headers," Internet Engineering Task Force, Internet Draft, Nov. 1997.

Kathleen Nichols and Steven Blake, "Differentiated Services Operational Model and Definitions," Internet Engineering Task Force, Internet Draft, Feb. 1998.

(List continued on next page.)

Primary Examiner—Kwang Bin Yao
(74) Attorney, Agent, or Firm—McDonnell Boehnen Hulbert & Berghoff (57) ABSTRACT

A method and apparatus for increasing call capacity in a packet switched telephony system in an emergency mode. The telephony system includes a management system, which detects an emergency, such as a surge in incoming media streams, a surge in traffic elsewhere in the system, a potential surge in traffic, and/or a convention emergency situation such as a natural disaster that may cause a surge in traffic. The management system alerts an internet telephony machine, such as a gateway, to the congestion problem. The internet telephony machine responds by switching to a lower bandwidth coder, thereby outputting each incoming media stream at a lower output rate, and thereby effectively increasing the capacity of the receive and handle calls.

27 Claims, 2 Drawing Sheets

OTHER PUBLICATIONS

Diff–serv–interest archive message 00003, Re: header rqts to support tracesl??, http://www–nrg.ee.lbl.,gov/diff–serv–interest/msg00003.html, dated Aug. 5, 1998.

SNA Services, "SLAs for SNA: What's Wrong with This Picture?," *Data Communications*, pp. 85–90, Aug. 1998.

Access, "Bandwidth Tools Branch Out," *Inter@ctive Week*, Oct. 26, 1998.

Quality of Service: Delivering QoX on the Internet and in Corporate Networks, http://www.wiley.com/compbooks/catalog/24358–2.htm, printed from the World Wide Web on Sep. 9, 1998.

An Economic Paradigm for QoS Provisioning in Information Systems, http://www.ics.forth.gr/~ramesh/pricing.html, printed from the World Wide Web on Sep. 9, 1998.

Microsoft Windows NT Server, Netshow Services Streaming Media for Business, Quality of Service, printed from the World Wide Web on Sep. 8, 1998.

Paul Ferguson and Geoff Huston, "Quality of Service in the Internet: Fact, Fiction, or Compromise?," printed from the World Wide Web on Sep. 9, 1998.

Access, "Policy–Based Gear to Debut," *Inter@ctive Week*, Sep. 7, 1998.

Remote Access & The Internet, "A Better Internet Awaits Us," *Lantimes*, Aug. 3, 1998.

Networking & Telecom, "QOS faces Growing Pains," *Infoworld*, May 25, 1998.

Netweek, "Newest QOS Plan Follows Same Old Pattern," *PC Week*, Jul. 13, 1998.

Creating a More Predictable Network, "Toward a Predictable WAN," *Lantimes*, Aug. 3, 1998.

Creating a More Predictable Network, "A Broad Future for Backbones," Lantimes, Aug. 3, 1998.

Technology Update, Packet Labeling Standard to Boost IP Performance, *Network World*, Jul. 13, 1998.

Strategies, "Deciphering SLAs," *PC Week*, Jul. 13, 1998.

* cited by examiner

METHOD AND SYSTEM FOR FACILITATING INCREASED CALL TRAFFIC BY SWITCHING TO A LOW BANDWIDTH ENCODER IN A PUBLIC EMERGENCY MODE

BACKGROUND OF THE INVENTION

1. Field of the Invention

The present invention relates to telecommunications transmission systems and more particularly to a method and apparatus for facilitating increased call capacity in a transmission system when faced with a state of emergency.

The invention is particularly useful in the context of packet switched networks such as the Internet, and especially in the context of internet telephony (also known as voice-over-IP (VoIP) or IP telephony). For purposes of illustration, the invention will be described in the context of internet telephony, where "internet telephony" refers generally to the transmission of real-time media signals and/or data signals via a packet switched network (such as the Internet, for example). More generally, however, the invention can extend to use in connection with communication of any real-time media and/or data signals over any packet switched communications link, including, for instance, IP, ATM, frame relay, X.25 and SNA networks, whether local area, metropolitan area or wide area, and point-to-point or direct end-to-end connections. In addition, the invention can extend to use in connection with communications between a pair of terminals (e.g., users) or among multiple terminals (e.g., in a multicast environment).

2. Description of the Related Art

Those skilled in the art are familiar with the basic configuration of an internet telephony system. Architectural elements and functions suitable for use in one such system are described, for instance, by the H.323 standard for multimedia transmissions, as published by the International Telecommunications Union (ITU). The entirety of the H.323 standard is hereby incorporated herein by reference. The present invention, however, is not necessarily limited to use in the H.323 configuration but may extend to other configurations or other transmission protocols. For example, another protocol that can support internet telephony is Session Initiation Protocol, or SIP.

In general, an internet telephony system facilitates telephone communication between two or more users over a packet switched, such as an IP network for example. Each user may be positioned at a telephone device (hereafter "telephone"), which may be a personal computer, a digital telephone, an analog telephone (e.g., a "black box telephone") or other suitable communications equipment. The telephone device may be any real-time media communication device, such as, for example, an audio telephone, a videophone, or a combination or subset of such devices and/or other devices. Each telephone device (and/or telephone number) is then typically served by a network access server, which provides connectivity to the packet switched network. In the context of internet telephony, the network access server may be referred to as an internet telephony gateway ("ITG" or "gateway") and is typically owned and operated by an internet telephony service provider (ITSP).

The gateway serves as an interface between the packet switched network and the communications link, and in turn the telephone device. In this regard, for instance, the gateway typically performs translation between protocols, data formats and media types, to facilitate communication of information between two possibly different types of networks or links. For example, a gateway may be configured to receive a real-time media stream from the communications link and to encode (e.g., compress and packetize) the stream into a sequence of packets for transmission over the packet switched network to a remote destination. Similarly, a gateway may be configured to decode (e.g., de-packetize and decompress) data arriving from the packet switched network and to forward the resulting media stream via a communications link to a specified telephone device.

To place a two-party call to over a packet switched network, a user at an initiating telephone device establishes a connection with an initiating gateway via a suitable communications link such as the public switched telephone network (PSTN) and/or other circuit switched or packet switched network or direct link. Alternatively, the telephone device itself may be directly connected to the IP network. The communications link may be a permanent or semi-permanent connection (as in the case of a LAN connection between the telephone device and the gateway), which may facilitate direct dialing. Alternatively, to connect with the gateway, the user may need to place a call over the public switched telephone network call to the gateway, such as by dialing a telephone number designated by the user's ITSP. In any event, the user may specify the telephone number of the called party.

In a packet switched network, the location of each gateway and other element is identified by a network address. Therefore, given the telephone number of a called party, the initiating gateway must identify the network address of a terminating gateway that can serve the called number. To identify the network address, the gateway may query an address mapping database or may send a signaling message to another device or process that can provide the necessary address based on the dialed number. In some systems, this address translation is facilitated by a signaling server such as a gatekeeper or proxy.

Provided with the network address of the terminating gateway, the initiating gateway may then contact the terminating gateway via the packet switched network and notify the terminating gateway of the desire to establish a connection with the called party. The terminating gateway may then establish an appropriate connection (e.g., over a communications link such as the PSTN) with a telephone device at the called number and notify the initiating gateway that the call can proceed. With the end-to-end connection thus established between the calling and called parties, the parties may then communicate with each other over the packet switched network, sending and receiving various communications signals, such as voice, video, audio and/or data.

The present invention relates to the capacity of telephony systems to receive and handle call traffic and specifically to the number of calls that the system can handle at any given time. One of the factors that is known to affect call capacity in a telephony network is the statistical analysis and engineering design that is involved in aggregating traffic in the network. In general, this analysis focuses on so-called "aggregation points," where traffic from a number of locations arrives to be processed and/or funneled through to a next point in the network.

An aggregation point typically has an input capacity (e.g., physical input ports, time slots, or channels), which may define a maximum amount of data that the aggregation point can receive and/or process at once (e.g., multiplexed, in parallel, etc.). In turn, the aggregation point typically has a processing capacity and/or output capacity, which defines a maximum amount of data that the aggregation point can process and/or output at once for transmission to the next (downstream) element in the network.

In many cases, it would be too expensive to build an aggregation point to be able to process and output all of its potential input in real time. Therefore, aggregation points are instead usually designed to have higher input capacity than processing capacity and/or output capacity. This design is based on statistical modeling and desired probabilities of call blocking. The statistical modeling assumes that, at any given time, something less than all of the input capacity will be filled, and that the input at any given time can therefore be statistically multiplexed among the available processing capacity and output capacity. If more than the statistically assumed input capacity arrives at once, some of the input may be blocked.

As an example of an aggregation point, consider the central office (CO) switch in the PSTN. A CO switch has a potential input capacity defined by a set number of input ports, each of which is permanently hard-wired to a telephone subscriber. The CO switch receives a number of incoming media streams (e.g., voice) from theses input ports and usually employs channels or time-slots to funnel multiple incoming streams into outgoing data. The output may thus take the form of a TDM (time division multiplexed) stream, for instance, where input media streams are time slotted together into a single output stream. Consequently, the CO switch has an output capacity, defined by the number of channels available in its output stream.

A CO switch is never designed to be able to handle calls from all of its subscribers at once. To be able to handle all such calls at once, the CO switch would require a statistically excessive number of time slots in its output or would require a statistically excessive number of output lines, either of which could be too expensive in practice. Instead, a CO switch is designed to be able to handle some statistically assumed maximum number of possible calls at once, with an accepted resulting probability any more calls than expected will be blocked.

For instance, although a CO switch may be hardwired to 10,000 subscribers, the assumption may be that only 10% of those subscribers, or 1,000 subscribers, will use their telephones at any one time. Therefore, the CO switch may be designed with output capacity for, say, 1,500 subscribers (thus providing a statistical 5% safety net). In the event that more than 1,500 of the subscribers attempt to use their telephones at once, some of the calls will be blocked.

As another example of an aggregation point, consider the tandem office (TO) switch in the PSTN. In most geographic regions, the output from a group of CO switches feeds into a TO switch, one of whose jobs it is to aggregate traffic from the CO switches, for transmission to a next downstream element in the network. Like the CO switch, the TO switch is usually designed with an input capacity sufficient to handle some statistically expected number of media streams arriving from the CO switches and with an output capacity sufficient to handle some statistically acceptable subset of that potential input capacity.

For instance, if the TO switch serves (is down stream from) four CO switches that each have a maximum output capacity of 1,500 media streams, the TO switch may be designed with a 6,000 port input capacity. However, if it is statistically assumed that no more than 3,000 media streams will arrive at the TO switch at any one time, then the TO switch may be designed with output capacity for, say 3,500 media streams (again providing a safety net). In the event that more than a total of 3,500 subscribers to the four CO switches attempt to use their telephones at once, some of the calls will be blocked due to a TO switch overload, even if none of the CO switches were at their full output capacity.

Aggregation points also exist in packet switched telephony. For instance, in most internet telephony systems, there will be a number of gateways in each geographic region. The gateways may be positioned in local telephone company central offices, in dedicated internet telephony offices, in the tandem switch office or in any other suitable location, operating in parallel with or instead of CO switches and/or TO switches. These gateways may be owned and operated by different ITSPs and/or may serve different groups of subscribers.

Each gateway in a region may receive a number of media streams concurrently from a number of subscribers, encode each media stream to produce a corresponding output packet sequence, and transmit the packets into the network. In the typical configuration, a packet router or other device such as a Layer 3 switch or an ATM switch (for example) will be provided downstream from these gateways in the packet switched network and will therefore receive most or all of the packets transmitted by all of the regional gateways.

This router or other downstream device serves as an aggregation point, typically designed with a particular input capacity and some limited capacity to process and output what it receives as input. In particular, a router, for instance, serves to route each packet independently into the network based on information contained in the packet header. Therefore, the amount of work performed by a packet router generally relates directly to the number of packets being routed. If the router receives more than some threshold quantity of packets at once, the router may fail (i.e., drop and/or excessively delay packets). Alternatively, the router or other downstream device may have a limited capacity to receive and/or process data, regardless of packet size. If such a downstream device receives more than some threshold quantity of data at once, the device may fail. In that event, calls may be blocked, delayed and/or distorted.

There is therefore a need in the art for an improved mechanism to facilitate handling of increased call traffic in an internet telephony system.

SUMMARY OF THE INVENTION

The present invention provides an improved mechanism to facilitate handling of increased call traffic in a packet switched telephony system. The invention stems in part from a realization that the statistical models employed in the design of telephony networks fail to adequately take into account emergency situations or other scenarios, such as a surge in call traffic, or such as situations that may give rise to a surge in call traffic.

In an emergency situation such as an earthquake, hurricane, blizzard, or other disaster, for example, everyone in the region affected by the emergency may try to use their telephones at once. As a result, it is likely that aggregation points in the region (or serving the region) will become overloaded. Their potential input capacity may become full and they may become unable to process and output all of the incoming media streams. Consequently, the statistical models used at those aggregation points may fail, and many calls may be blocked.

In the PSTN, for instance, when an emergency situation occurs, all of the input ports to CO switches in the region may be used. If a CO switch is designed with smaller output capacity than input capacity, the CO switch may be unable to handle the increased load and may therefore block calls. Further, even if some or all of the CO switches in the region are able to handle the increased load, the next aggregation point in the switching hierarchy, such as a TO switch, may be unable to handle the total increased load stemming from all of the CO switches and may therefore block calls. As a consequence, many important calls may be unable to connect.

Unfortunately, in a circuit switched telephony system such as the PSTN, little can be done to increase the capacity of the system to receive calls in the face of a surge in call traffic. One reason for this limitation is that, by definition, a circuit switched network treats each call connection as a separate "circuit" or channel (even though the circuits may be multiplexed together, for instance, in a T1 or ISDN stream). Each of these channels has a block of bandwidth (for instance, 64 kbps/second for each T1 channel), and a given channel cannot be shared among multiple calls.

In a packet switched telephony system, however, this is not the case. Advantageously, with packet switched telephony, available data packages (e.g., groups of bits, packets, etc.) can be shared among a number of calls. Consequently, as presently contemplated, it is possible to increase the call capacity of the telephony system by representing each input media stream with fewer bits and/or fewer packets.

Thus, in accordance with a preferred embodiment, a method and apparatus is provided for responding to a surge in call traffic or other emergency situation by changing the rate at which media streams are established and/or conveyed. This change in rate, for instance, may involve lowering the bit rate (bandwidth) per media stream and/or lowering the packet rate per media stream. By lowering the rate per media stream, the total number of streams that can be handled (e.g., processed and/or output) per unit time by a given device can be increased. As a result, bottlenecks in the network that would otherwise result from aggregation of call traffic can be fully or partially alleviated.

According to one aspect, for instance, an improved internet telephony machine is provided. The internet telephony machine, which may be an internet telephony gateway, may include an input interface, a processor and an output interface. The input interface receives media streams, the processor encodes each media stream according to a predetermined encoding process and thereby produces output data at a predetermined output rate, and the output interface transmits the resulting output data into a packet switched network. The internet telephony machine may receive emergency-indicia, which indicates the existence of an emergency situation such as high call congestion in the network, and/or some other event that may give rise to high call-congestion in the network. In response, the machine may modify its predetermined encoding process, such as by switching to a different encoder that represents each input media stream at a lower bit rate and/or lower packet rate. Consequently, the machine may output more encoded media streams without overburdening the network.

According to another aspect, for instance, a method is provided for increasing the call capacity of an internet telephony system. Call traffic from a plurality of gateways typically feeds into a router or other downstream aggregation point. The router, for instance, serves as an aggregation point and can experience bottlenecks when there is a surge of incoming call traffic. To overcome this problem, in response to a detection of traffic congestion, the gateways may decrease the rate at which they encode media streams, thereby sending fewer data packages (e.g., fewer packets and/or fewer bits) per media stream to the router and thereby allowing the router to handle the packet traffic from the increased number of media streams.

The foregoing as well as other advantages and features of the present invention will become apparent from reading the following detailed description, with reference where appropriate to the accompanying drawings.

BRIEF DESCRIPTION OF THE DRAWINGS

A preferred embodiment of the present invention is described herein with reference to the drawings, in which.

DETAILED DESCRIPTION OF THE PREFERRED EMBODIMENTS

The present invention provides a method and apparatus for increasing the call capacity of an internet telephony system. According to the preferred embodiment, this increase in call capacity can be achieved by effectively decreasing the bandwidth that is allocated to each of a plurality of media streams entering the system. Since the load in an internet telephony system is defined by the rate of data transmission (e.g., packets/second or bits/second) in the system rather than by the number of underlying media streams that are being conveyed (as in a circuit switched network), a decrease in the bandwidth per media stream will effectively allow the system to receive and handle more media streams within the total available bandwidth.

As presently contemplated, a preferred location to change the bandwidth allocation per media stream is an internet telephony machine positioned at the entrance to the packet switched network. For illustration, this internet telephony machine will be described as an internet telephony gateway. However, the machine may more generally be any machine that receives media streams of any type and can encode the streams for transmission into a packet switched network. Typically, the machine will have an input interface, a processor and an output interface. The input interface, which may be a number of separate interfaces, will receive a plurality of input media streams. The processor, which may be a number of separate processors, will encode each media stream according to a predetermined encoding process to produce output data (an encoded media stream in the form of a packet sequence) at an output rate. The output interface, which may be a number of separate interfaces, will, in turn, transmit the packets into the packet switched network for receipt by a downstream element or remote device.

The effects of reducing the bandwidth allocation per media stream may be felt throughout the telephony system. Elements downstream from the gateway in the packet switched network will be able to receive and handle more media streams (represented by data) at once. For example, if a transmission line from the gateway into the packet switched network provides an upper limit on total bandwidth output from a gateway, the gateway itself will be able to output data representing more media streams at once along that transmission line. As another example, a router or other aggregation point downstream from the gateway may be able to receive data representing more media streams at once, thereby allowing higher media-stream throughput by the gateway as well as by other gateways that feed the aggregation point.

In addition, elements upstream from the gateway in the PSTN for instance may be able to provide more media streams to the gateway at once, potentially limited only by the number of input channels at the gateway. For example, assume that the gateway receives media streams from a plurality of CO switches. Absent a decrease in bandwidth per media stream, the internet telephony system could limit the number of media streams that the CO switches can output, similar to how a TO switch in the PSTN unavoidably limits the number of media streams that CO switches can output. By sufficiently decreasing the bandwidth allocation per media stream, however, the internet telephony system can receive and handle more of these media streams at once, and the CO switches may therefore achieve their full potential output capacity.

Figure 1:
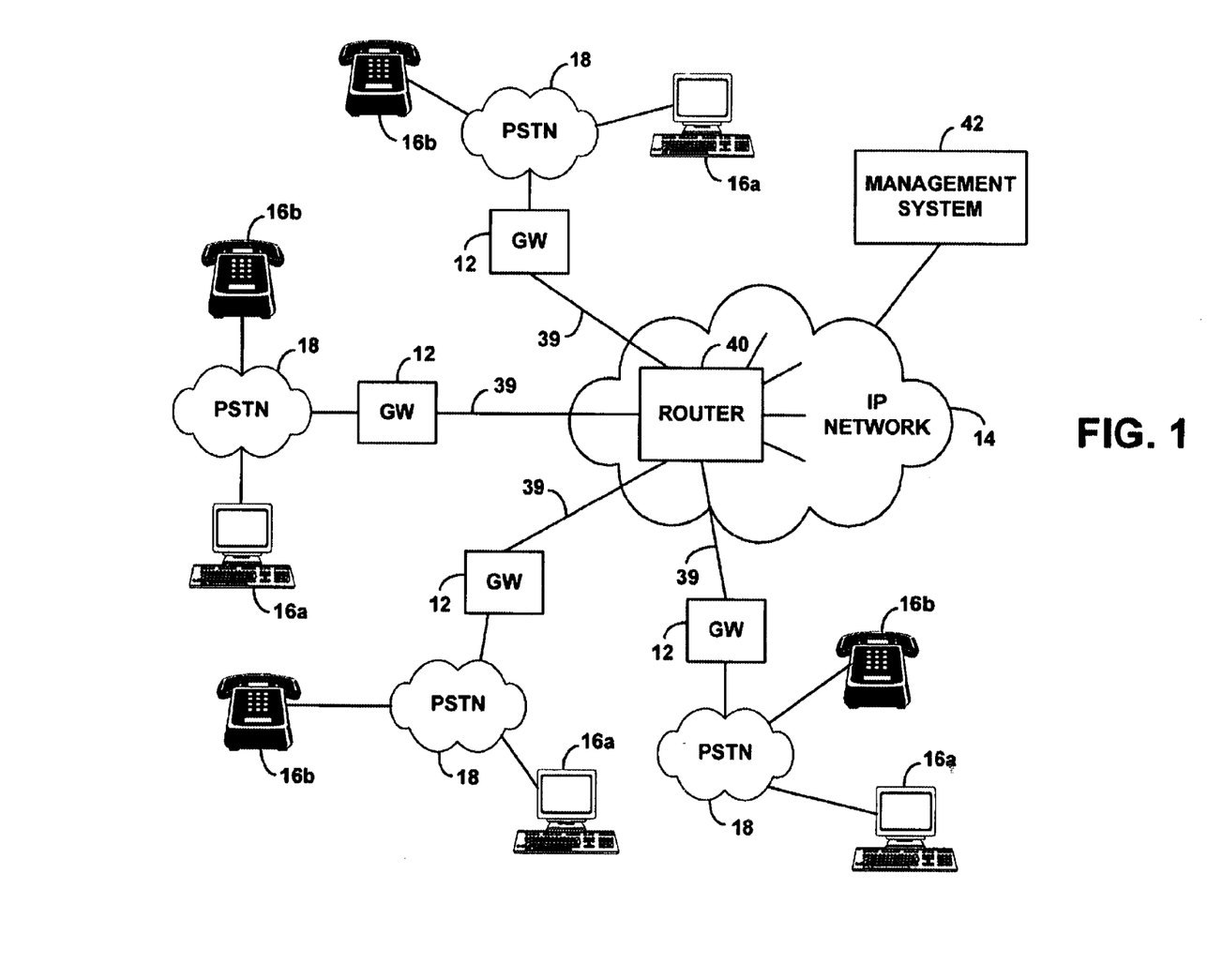
FIG. 1 illustrates an internet telephony system in which a preferred embodiment of the present invention may be implemented.

FIG. 1 illustrates schematically an internet telephony system in which the present invention can be employed. Aspects of this system have been described in the above background section, but the system is presented here for illustration. As shown in FIG. 1, a plurality of internet telephony gateways (GW) 12 each provide connectivity with a packet switched network (shown, for example, as an IP network) 14. Telephone subscribers sign up for service offered by an internet telephony service provider (ITSP). Each subscriber may then use a telephone device 16, which is arranged to convey (and preferably receive) media streams such as voice, video, audio, and/or data, for instance. By way of example and without limitation, the telephone device 16 may be a personal computer 16a equipped with a microphone and speaker, or a standard analog or digital telephone 16b, whether corded or wireless.

A subscriber establishes a connection via a communications link between the telephone device and a gateway operated by the subscriber's ITSP. This communications link may take any form. As described above, and as illustrated in FIG. 1, for instance, the link may comprise the PSTN (or more broadly, the general switched telephone network (GSTN)) 18. The link may also comprise another suitable computer network (such as a LAN, for instance) or direct end-to-end connection between the subscriber's telephone device 16 and the gateway 12. In the preferred embodiment, the communications link provides a plurality of media streams to the gateway at once, in the form of a channelized or time-slotted data stream such as a TDM stream. In addition, the link may comprise multiple physical lines each carrying one or more data streams to the gateway.

As noted above, the gateway serves as an interface between the communications link and the packet switched network. To effect the transmission of media streams from the communications link into the packet switched network, for instance, the gateway may encode each input media stream according to a predetermined encoding process. Typically, this encoding process conforms with one or many well known encoding schemes, such as G.723.1 and G.711 for audio, and H.261 and H.263 for video (as recommended by the International Telecommunications Union), for example, and results in a sequence of packets corresponding to the input media stream. However, any suitable encoding process may be employed.

In general, the predetermined encoding process may operate on each media stream at some predetermined encoding rate in order to produce an output packet stream having a predetermined output rate. This output rate, such as a bit rate and/or packet rate, is therefore defined and limited by the predetermined encoding process. Depending on design criteria, the predetermined encoding process may vary from media stream to media stream.

By way of example, according to the well known G.723.1 protocol, the processor may sample every 30 ms of an input media stream with 240 samples and compress the samples to 24 bytes. For transmission into an IP network, the processor may then add a packet header of 40 bytes. Thus, with this arrangement, the resulting output rate is 17 kbits/second and 33.3 packets/second. As another example, the well known G.711 protocol calls for sampling every 10 ms of an input media stream with 80 samples and compressing the samples to 80 bytes. As with G.723.1, the processor may add a packet header of 40 bytes. Therefore, the resulting output is about 96 kbits/second and 100 packets per second.

Exemplary internet telephony gateways are commercially available from 3Com Corporation and other telecommunications equipment manufacturers such as Ascend Communications, Livingston Enterprises, Multitech and Cisco. A representative gateway, for instance, is the Total Control™ IP Telephony Gateway from 3Com Corporation. The Total Control™ IP Telephony Gateway takes substantially the form of a network access server (NAS) as described in the patent of Dale M. Walsh, et al., U.S. Pat. No. 5,597,595 ("the Walsh patent"), which is fully incorporated herein by reference and to which the reader is directed for additional details. The gateway has a telephone line interface that can be connected to a plurality of high-speed multiplexed digital telephone lines, such as a T1 or ISDN lines. The gateway further provides a plurality of digital modems to perform signal conversions (such as sampling, compressing and packetizing) on the data from the telephone line channels and a bus network connecting the modems to a network interface card or module. The network interface card in turn couples the gateway to a local or wide area network, such as the ISP backbone network of the Internet.

Figure 2:
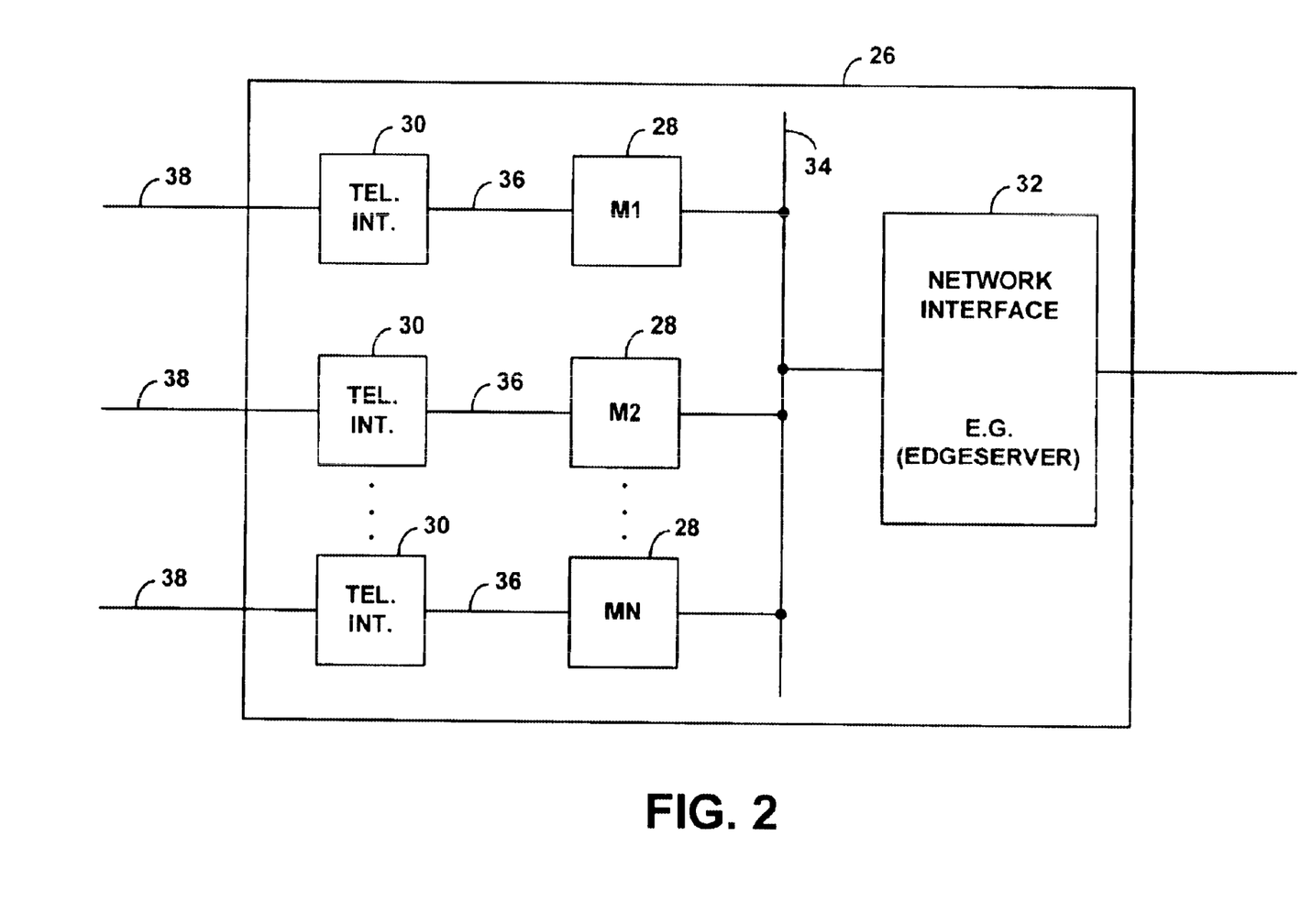
FIG. 2 illustrates an internet telephony gateway in which a preferred embodiment of the present invention may be implemented.

Referring to FIG. 2, for instance, an exemplary gateway 26 is illustrated in greater detail. Exemplary gateway 26 includes a plurality of high density modem modules 28, each having (or being coupled with) its own telephone line interface 30 for interfacing with the PSTN two-wire analog, T1, E1, T3, E3, ISDN and/or primary rate services. The high density modem modules 28 additionally communicate with a network interface 32 over a packet system bus 34. The high density modem modules, the telephone interfaces and the network interface are preferably on individual printed circuit boards or cards arranged in a chassis.

The high density modem modules are "high density" in that each contains a high density digital signal processing (DSP) configuration capable of handling any desired number of channels, such as, for example, 23, 24, 30 or 672 DS0 channels. In the preferred embodiment, each modem card can be programmed with an appropriate set of machine language instructions stored in a memory and executed by a processor to carry out various functions described and claimed herein. Further, the number of high density modem cards 28 and associated telephone line interface cards 30 is essentially arbitrary, but 10 to 24 such cards are typical in a high density gateway application today, thereby facilitating simultaneous independent processing of media streams carried by 240 to 576 DS0 channels. An exemplary high density DSP is the HiPer DSP available from 3Com Corporation.

In the gateway of FIG. 2, each high density modem card 28 has its own telephone line interface 30, connected to the PSTN line. The telephone line interface 30 is then connected to the high density modem cards by a TDM bus 36, as described in the Walsh patent. The telephone line interface 30 is composed of two separate modules (not shown), an incoming call interface module and an incoming call application module. For T1 signals, for instance, the interface module physically receives incoming T1 span lines at connection 38, converts the signal in a digital TTL format and delivers the signal to the incoming call application module. The interface module provides a channel switching unit (CSU) interface, which recovers clock signals and data from the incoming T1 signals and also provides the transmission of outgoing digital telephone signals representing digital data to the line at connection 38. The application module provides framing of recovered T1 data to extract the T1 DS0 channel data and then switches the channel data twenty four time slots on a TDM bus 36 to the corresponding high density modem module 28. Of course, the telephone interface may take other forms as well.

The high density modem cards 28 are connected to the network interface card via a high-speed parallel packet bus 34, similar to that described in the Walsh patent. The network interface 32 may be a 3Com EdgeServer™ card, NetServer™ card or other suitable interface. The EdgeServer™ card, for instance, consists of a general purpose computing platform (such as an IBM PC) running an operating system such as Windows NT™ from Microsoft Corporation, or UNIX. The network interface card 32 contains software and hardware modules to perform call routing, modem configuration and other features as set forth and described for the gateway modules in the Walsh patent as well as in the patent of Baum et al., U.S. Pat. No. 5,577,105, which is also fully incorporated herein by reference. Further details of the design and features of the EdgeServer™ card 32 are set forth in the U.S. patent application of Verthein et al., application No. 08/813,173, which is fully incorporated herein by reference as well. The network interface card may also be programmed with an appropriate set of machine language instructions stored in a memory and executed by a processor to carry out various functions described and claimed herein.

Referring again to FIG. 1, a number of gateways 12 in a given geographic region may transmit their output packets via network links 39 to a regional packet router 40. Router 40 in turn serves to route each packet independently to a next node in the packet switched network, on the way to a destination address specified in the packet header.

In a typical arrangement, router 40 serves as an aggregation point, since it is potentially able to receive more data than it can actually process and output in real time. In particular, the router may be able to process and route a limited number of packets per unit time and/or a particular quantity of data (e.g., bits) per unit time. If the load on the router exceeds a limit, the router may fail to operate, and packets may not reach their destination. Just as a TO switch may block calls in the PSTN that could arrive from CO switches, the router may therefore block data that could arrive from gateways.

By way of example, referring to FIG. 1, assume that each of the network links 39 supports a total of 10 Mbits/second and router 40 therefore has a potential input capacity of 40 Mbits/second. Assume further that the statistically expected input to the router is only 40% of this potential load. With that assumption, the router may be safely designed to handle up to 50% of this load, or 20 Mbits/second. If more than two of the gateways 12 on average outputs the full 10 Mbits/ second onto corresponding links 39, the router 40 will become overburdened and may fail.

On a small scale, a loss of data arising from over-aggregation of traffic at the router 40 or other downstream aggregation point may be cured by employing a suitable forward error correction encoding scheme at the gateway. However, on a larger scale, as for instance, when all of the input channels of all of the gateways in a particular region become filled, the system as a whole may fail, and forward error correction may not help.

In accordance with a preferred embodiment, a gateway may be programmed to detect an emergency situation and/or to receive and respond to a control signal that indicates an emergency situation. In either case, the gateway may be considered to be "receiving" emergency-indicia, in the sense that the gateway is either detecting an indication of an emergency or being alerted to an emergency. This control signal may also be referred to as a congestion signal. The gateway may include a control module, such as one or more of its processors appropriately programmed to receive emergency-indicia and respond by changing the bandwidth that it allocates per media stream.

As used herein, the term "emergency" may extend to any situation in which a surge or increase in call traffic has resulted or may result. By way of example and without limitation, an emergency situation may include a known surge or increase (or potential surge or increase) in call traffic at a device or process in the telephony system (such as at a gateway, a switch, a router, or another aggregation point), or a disaster such as an earthquake, hurricane, tornado, typhoon, flood or fire, which may cause all of the subscribers in the affected region to try to place calls at once. Other situations may constitute emergencies as well, and the categorization of any particular situation as an emergency may be a matter of design choice.

In a preferred embodiment, the internet telephony system may be equipped with a management system that serves to identify when there is or may be a surge or increase in call traffic or other emergency situation. The management system thus serves to alert one or more gateways in the region to the emergency situation, thereby allowing the gateway(s) to reduce their output load per media stream accordingly.

FIG. 1 illustrates a management system 42 generally as a component interconnected to (i.e., in communication with) the packet switched network 13 by way of example. More generally, however, the management system may take any suitable form and can be located in any suitable location and/or carried out by any suitable device or process in the telephony system. For instance, the management system may be a process carried out by a gateway, router or signaling server in the telephony system, or the management system may be distributed throughout the telephony system. An exemplary system for collecting performance statistics regarding traffic and components in an internet telephony system is described, for example, in a U.S. Patent Application entitled "Method and System for Monitoring and Management of the Performance of Real Time Networks" (inventors Grabelsky et al.), filed on Feb. 19, 1999, and assigned to the owner of the present invention. The entirety of the Grabelsky application is hereby incorporated herein by reference. This performance management system may be adapted to determine when a congestion situation or other emergency exists in the network. Still alternatively, at a most basic level, the management system may comprise a person viewing traffic data at a computer workstation.

By way of example, a gateway itself may be programmed with an internal management system to detect a surge in call traffic at the gateway. For this purpose, for instance, those skilled in the art may readily program the network interface card or other processor in the gateway with a set of machine language instructions to monitor the number of media streams that the gateway is receiving per unit time and/or to monitor the total output rate (e.g., total bits/second or packets/second) of the gateway (which typically includes output for a number of media streams). If the internal management system detects that the gateway is receiving and/or outputting more than a predetermined level of traffic per unit time, then the gateway may conclude that an emergency situation exists. In addition, the gateway may be further programmed to notify other gateways in the area of a potential congestion problem, for instance, by sending congestion signals to those other gateways.

Alternatively or additionally, the management system may be located outside a gateway. For instance, router 40 or another downstream aggregation point may be programmed with an internal traffic management system to detect a surge in incoming packet traffic. For this purpose, the router may include a processor, a memory and a set of machine language instructions stored in the memory and executable by the processor to determine when the packet load on the router or other aggregation point exceeds a predetermined threshold level. When the management system detects more than the predetermined threshold level, the router may conclude that an emergency situation exists, and the router may send a congestion signal to the upstream gateways 12, asking the gateways to slow down.

In accordance with a preferred embodiment, when the gateway 12 receives a congestion signal, the gateway will reduce its output load per media stream by switching to a lower quality encoder or by otherwise adjusting its encoding process. The process of switching to a lower quality coder may take any suitable form. In general, the process involves lowering the rate at which each media stream is encoded, or in some other way decreasing the bandwidth that the gateway outputs per media stream. A lower rate may be achieved by sampling the incoming media stream with fewer samples per unit time, by representing the resulting samples with fewer bits, by representing the resulting data with fewer packets, and/or in any other suitable fashion.

By way of example, the gateway may have a normal, non-emergency operation mode, in which the modems (or other processors) in the gateway are set to execute a first set of stored machine language instructions that defines a first predetermined encoding process for encoding each incoming media stream at a first encoding rate and for outputting a corresponding sequence of packets at a first output rate (bit rate and packet rate). The modems may additionally have a second set of stored machine language instructions that define a second predetermined encoding process for encoding each incoming media stream at a second encoding rate and for outputting a sequence of packets at a second output rate lower than the first output rate. When the gateway receives a congestion signal, the gateway may switch to an emergency-mode. In the emergency mode, the modems in the gateway may be programmed to responsively switch to execute the second set of machine language instructions rather than the first set of machine language instructions. Consequently, as media streams arrive at the gateway, the gateway will encode the streams at a lower rate and thereby output corresponding data at a lower rate than in the non-emergency mode.

As another example, the gateway may have a normal, non-emergency mode, in which a processor (such as provided by the modems or the network interface card) adds various parity information to each encoded media stream in order to provide forward error correction functionality. Upon receiving a congestion signal, the gateway may switch to an emergency-mode in which the processor either cuts back on the amount of redundancy information that it adds to the output or stops forward error correction encoding the media streams altogether. In this way, the bandwidth used per media stream is reduced, and the internet telephony system can receive and handle a larger capacity of media streams at once.

As still another example, in a non-emergency mode, the gateway may encode each incoming media stream to produce packets that each have a payload of n bits. In response to a congestion signal, the gateway may switch to encode each media stream so as to produce packets that each have a larger payload, such as 2n, for example. In this way, the bandwidth per media stream is decreased as well, since the header size per packet is presumed to remain constant, while the payload per packet increases. The total bit rate per media stream decreases since fewer packet headers are required (due to fewer packets). Perhaps more importantly, however, the total packet rate per media stream can substantially decrease, which can substantially alleviate the burden on a downstream aggregation point such as router 40.

As yet a more specific example, assume that a gateway normally encodes each incoming media stream according to the G.711 protocol and adds 40 byte RTP/UDP/IP packet headers to each resulting packet. The gateway therefore produces for each media stream a sequence of output data with a one-way bit rate of 96 kbits/second and a one-way packet rate of 100 packets/second as described above. In response to a congestion control signal, the gateway may automatically switch to encode each incoming media stream according to the G.723.1 protocol (at 6.3 kbits/second), still adding 40 byte headers. As a result, the gateway would then begin to produce for each incoming media stream a sequence of output data with a one-way bit rate of only 17 kbits/second and a one-way packet rate of only 33 packets/second. With this decrease in bandwidth per media stream, the internet telephony system in at least the region of the gateway may be able to handle three to five times as many connections at once.

In some cases, the decrease in bandwidth per media stream will degrade the quality of the media transmission. This degradation results from approximating each media stream with less information. In addition, if the decrease in bandwidth is achieved by removing or not adding parity information, a degradation in transmission quality may result from a lack of adequate forward error correction coding. It instances of emergency, however, the sacrifice in media quality may be substantially outweighed by the need to support increased call capacity.

A preferred embodiment of the present invention has been described. It will be understood, however, that changes and modifications may be made to the described embodiment without deviating from the spirit and scope of the invention, as defined by the following claims.

In addition, use of the term "means" in any claim is intended to invoke 35 U.S.C. § 112, paragraph 6, and any claim without the word "means" is not so intended.

We claim:

1. In an internet telephony machine receiving a plurality of input media streams and encoding each of said input media streams according to a predetermined encoding process so as to produce for each input media stream an encoded media stream at a predetermined output rate, said internet telephony machine outputting said encoded media streams into a packet switched network, a method comprising, in combination:

receiving emergency-indicia indicative of a public emergency comprising a natural disaster; and responsively changing said predetermined encoding process so as to lower said predetermined output rate per media stream, whereby a lower output rate per media stream may facilitate transmission of an increased number of media streams in said packet switched network.

2. A method as claimed in claim 1, wherein receiving said emergency-indicia comprises detecting the public emergency.

3. In an internet telephony machine receiving a plurality of input media streams and encoding each of said input media streams according to a predetermined encoding process so as to produce for each input media stream an encoded media stream at a predetermined output rate, said internet telephony machine outputting said encoded media streams into a packet switched network, a method comprising, in combination:

receiving emergency-indicia indicative of a public emergency, wherein receiving said emergency-indicia comprises detecting said public emergency, and wherein said public emergency comprises a natural disaster selected from the group consisting of an earthquake, a flood, a typhoon, a hurricane, a tornado, a blizzard, and a fire; and responsively changing said predetermined encoding process so as to lower said predetermined output rate per media stream, whereby a lower output rate per media stream may facilitate transmission of an increased number of media streams in said packet switched network.

4. In an internet telephony machine receiving a plurality of input media streams and encoding each of said input media streams according to a predetermined encoding process so as to produce for each input media stream an encoded media stream at a predetermined output rate, said internet telephony machine outputting said encoded media streams into a packet switched network, a method comprising, in combination:

receiving emergency-indicia indicative of a public emergency, wherein receiving said emergency-indicia comprises receiving a control signal from a management system indicating that there is or may be a natural disaster; and responsively changing said predetermined encoding process so as to lower said predetermined output rate per media stream, whereby a lower output rate per media stream may facilitate transmission of an increased number of media streams in said packet switched network.

5. A method as claimed in claim 1, wherein said predetermined output rate comprises a rate selected from the group consisting of bit rate and packet rate.

6. A method as claimed in claim 1, wherein said internet telephony machine comprises a gateway.

7. An internet telephony machine comprising an input interface, a processor and an output interface, said input interface receiving a number of input media streams;

said processor encoding each of said input media streams according to a predetermined encoding process, thereby producing for each input media stream a corresponding output media stream at an output rate;

said output interface transmitting into a packet switched network the output media streams corresponding to a plurality of said input media streams;

said machine receiving emergency-indicia indicative of a natural disaster and responsively changing said predetermined encoding process so as to lower said output rate for each of a plurality of said input media streams.

8. An internet telephony machine as claimed in claim 7, wherein said natural disaster comprises an event selected from the group consisting of an earthquake, a flood, a typhoon, a hurricane, a tornado, a blizzard, and a fire.

9. An internet telephony machine as claimed in claim 7, wherein said machine receives said emergency-indicia from a downstream device in said packet switched network.

10. An internet telephony machine as claimed in claim 9, wherein said machine comprises an internet telephony gateway, and said downstream device comprises a router or other aggregation point.

11. An internet telephony machine as claimed in claim 7, wherein said output rate comprises a bit rate.

12. An internet telephony machine as claimed in claim 7, wherein said output rate comprises a packet rate.

13. An internet telephony machine as claimed in claim 7, further comprising a first set of machine language instructions stored in a data storage medium and defining a first encoding process executable by said processor, and a second set of machine language instructions stored in a data storage medium and defining a second encoding process executable by said processor, wherein said predetermined encoding process comprises said first encoding process; and wherein changing said predetermined encoding process comprises switching said predetermined encoding process to said second encoding process.

14. An internet telephony machine receiving a number of input media streams and encoding each of said input media streams according to a predetermined encoding process, thereby producing for each input media stream a corresponding output media stream at an output rate, said internet telephony machine receiving a signal indicative of a natural disaster and responsively changing said predetermined encoding process so as to lower said output rate for each of a plurality of said input media streams, whereby packet traffic at a downstream aggregation point may be reduced.

15. An internet telephony machine as claimed in claim 14, comprising an internet telephony gateway.

16. An internet telephony machine as claimed in claim 14, wherein said downstream aggregation point comprises a router.

17. An internet telephony machine as in claim 14, wherein the natural disaster comprises an event selected from the group consisting of an earthquake, a flood, a typhoon, a hurricane, a tornado, a blizzard, and a fire.

18. In an internet telephony machine that outputs packets for receipt by a downstream aggregation point, a method for processing data comprising the following steps:

encoding input media streams at a first encoding rate at said internet telephony machine in the absence of a natural disaster, thereby outputting packets from said internet telephony machine at a first packet rate; and changing said encoding of said input media streams from said first encoding rate to a second encoding rate during a natural disaster, and thereby outputting packets from said internet telephony machine at a second packet rate, said second packet rate being lower than said first packet rate, whereby congestion at said downstream aggregation point may be reduced during the natural disaster.

19. A method as claimed in claim 18, further comprising receiving from management system a signal indicative of the natural disaster and responsively performing said changing step.

20. A method as claimed in claim 19, wherein said management system comprises said downstream aggregation point.

21. A method as claimed in claim 18, wherein said internet telephony machine comprises a gateway.

22. A method as claimed in claim 18, wherein said downstream aggregation point comprises a router.

23. A method as in claim 18, wherein the natural disaster comprises an event selected from the group consisting of an earthquake, a flood, a typhoon, a hurricane, a tornado, a blizzard, and a fire.

24. A gateway for internet telephony with natural disaster related congestion control for a downstream aggregation point, comprising:
- a central processing unit normally encoding an input media stream at a first encoding rate and generating packets for said downstream aggregation point at a first packet rate;
- a control module in said gateway receiving an emergency-indicia signal indicative of a natural disaster; and
- in response to said emergency-indicia signal, said control module adjusting said central processing unit to encode said input media stream at a second encoding rate to thereby generate packets for said downstream aggregation point at a second packet rate, said second packet rate being less than said first packet rate.

25. A gateway as claimed in claim 24, wherein said downstream aggregation point comprises a router.

26. An internet telephony routing system with natural disaster related rate control, comprising, in combination:
- a plurality of gateways, each providing an output;
- a downstream router receiving said output from said gateways;
- each of said gateways having a first mode in which said gateway encodes input media streams at a first encoding rate to thereby generate packets for said downstream router at a first packet rate, and a second mode in which said gateway encodes input media streams at a second encoding rate to thereby generate packets for said downstream router at a second packet rate;
- a management system sending emergency-indicia to said gateways in response to a natural disaster; and
- said gateways switching from said first mode to said second mode in response to said emergency-indicia, whereby the packet load on said downstream router may be reduced.

27. An internet telephony routing system as in claim 26, wherein the natural disaster comprises an event selected from the group consisting of an earthquake, a flood, a typhoon, a hurricane, a tornado, a blizzard, and a fire.

* * * * *